United States Patent
Bynum (10) Patent No.: US 12,122,607 B1
(45) Date of Patent: Oct. 22, 2024

(54) POWER TRANSFER FROM MAIN BOOM SECTION TO DISTAL BOOM SECTION IN A CONVEYOR ASSEMBLY

(71) Applicant: Walter Bynum, Palm City, FL (US)

(72) Inventor: Walter Bynum, Palm City, FL (US)

(*) Notice: Subject to any disclaimer, the term of this patent is extended or adjusted under 35 U.S.C. 154(b) by 0 days.

(21) Appl. No.: 18/382,178

(22) Filed: Oct. 20, 2023

(51) Int. Cl.
  *B65G 23/34* (2006.01)
  *B65G 21/12* (2006.01)
  *B65G 21/14* (2006.01)
  *B65G 23/06* (2006.01)
  *B65G 23/30* (2006.01)

(52) U.S. Cl.
  CPC ............ *B65G 23/34* (2013.01); *B65G 21/12* (2013.01); *B65G 21/14* (2013.01); *B65G 23/30* (2013.01); *B65G 23/06* (2013.01); *B65G 2812/02089* (2013.01); *B65G 2812/02148* (2013.01)

(58) Field of Classification Search
  None
  See application file for complete search history.

(56) References Cited

U.S. PATENT DOCUMENTS

| | | | |
|---|---|---|---|
| 4,186,161 A * | 1/1980 | Ulmschneider | B29C 45/06 264/161 |
| 4,258,840 A | 3/1981 | Conkle | |
| 4,944,364 A * | 7/1990 | Blasko | B66F 11/044 212/300 |
| 5,016,731 A * | 5/1991 | Holmes | B66F 11/044 254/228 |
| 5,176,485 A * | 1/1993 | Ruder | B65G 67/08 414/688 |
| 6,325,749 B1 | 12/2001 | Inokuchi et al. | |
| 7,108,125 B2 * | 9/2006 | Gilmore | A61L 31/16 198/313 |
| 9,948,163 B2 | 4/2018 | Harrison | |
| 10,787,321 B1 | 9/2020 | Jennings | |
| 11,021,327 B2 * | 6/2021 | Porter | B65G 21/02 |
| 11,075,574 B1 | 7/2021 | Beck et al. | |
| 11,187,001 B1 * | 11/2021 | Bynum | B65G 47/44 |
| 11,359,351 B2 * | 6/2022 | Ness | B66C 1/06 |
| 2011/0097181 A1 | 4/2011 | Wuthrich et al. | |
| 2012/0152699 A1 | 6/2012 | Yang et al. | |
| 2020/0347576 A1 | 11/2020 | Ness et al. | |

FOREIGN PATENT DOCUMENTS

| | | |
|---|---|---|
| DE | 202008018541 | 6/2015 |
| EP | 3412604 | 12/2018 |
| GB | 696916 | 9/1953 |

* cited by examiner

*Primary Examiner* — Kavel Singh
(74) *Attorney, Agent, or Firm* — The Concept Law Group, PA; Scott D. Smiley; Scott M. Garrett (57) ABSTRACT

A boom assembly for conveying material includes a main boom assembly and a distal boom section. The main boom assembly is mounted at one end, and at the distal end of the main boom assembly there is a distal boom section. The main boom assembly can be a telescoping boom assembly having a fixed section and the telescoping section that extends from and retracts into the fixed section. A main conveyor belt transits the main boom assembly and drives a pulley at the distal end of the main boom section, which in turn is used to drive the distal boom section, in particular the distal section conveyor belt. Other equipment can also be powered using electrical or hydraulic means.

16 Claims, 7 Drawing Sheets

POWER TRANSFER FROM MAIN BOOM SECTION TO DISTAL BOOM SECTION IN A CONVEYOR ASSEMBLY

FIELD OF THE INVENTION

The present invention relates generally to mobile conveyor systems for placing construction material, and, more particularly, relates to mobile conveyor systems that include a main boom section with a main section conveyor belt, and a distal boom section with a distal section conveyor belt, wherein a distal pulley at the distal end of the main boom section drives a mechanism that transfers power to the distal boom section to drive the distal section conveyor belt, and provide auxiliary power at the distal boom section location.

BACKGROUND OF THE INVENTION

There are a variety of industries in which multi-section conveyor systems are used to move materials from one location to another location. Each section of conveyor will have its own drive source to move the conveyor belt, although power, such as electric power, may be routed along the conveyor system to connect to motors at each section. In some applications this is not practical, however. For example, in construction industries, conveyor systems are being used to replace pump systems for the placement of construction material. The construction material is moved from one location at the construction site to a construction location where the construction material is needed. While pumping systems are effective, there is considerable risk of the terminal end of the system, which is typically a tube, breaking loose due the expulsion of air from the tube. This can create whip in the terminal section, and as a result, the end of the tube can impact objects or personnel in the vicinity. This kind of event has occurred and caused severe injury and death. As a result, conveyor systems have become favored in many applications because they do not require high pressure, and they waste far less material than pump systems.

In a mobile multi-section conveyor boom assembly, there is typically a main boom section that can be extended or retracted to deliver construction material at a desired placement location by conveyor. It is not uncommon for there be a need for power at the placement site, to, for example, run handheld power tools, or other equipment. One solution to this would be to run power lines along the boom assembly so that there is an outlet at the distal end of the boom assembly. Power could be provided, for example, by a generator on the vehicle platform in which the boom assembly is mounted. However, given the considerable wear and the operating environment, an extra power line is not an optimum solution as it would likely be broken often.

Therefore, a need exists to overcome the problems with the prior art as discussed above.

SUMMARY OF THE INVENTION

In accordance with some embodiments of the inventive disclosure, there is provided a boom assembly for placement of construction material that incudes a main boom section having a distal end and a proximal end opposite the distal end, a distal pulley positioned at the distal end of the main boom section, a main boom section conveyor belt transiting the main boom section which passes over and turns the distal pulley of the main boom section. There is also includes a distal boom section that is coupled to the distal end of the main boom section and which has a drive pulley around which a distal section conveyor belt is driven to transit the distal boom section. Movement of the main boom section conveyor belt causes the distal pulley at the distal end of the main boom section to turn, and rotation of the distal pulley of the main boom section results in rotation of the drive pulley of the distal boom section, thereby causing movement of the distal boom section conveyor belt.

In accordance with a further feature, the distal pulley of the main boom section drives a drive gear, a chain is disposed around the drive gear and a matching gear that is coupled to the drive pulley of the distal boom section.

In accordance with a further feature, the distal pulley of the main boom section drives a first hydraulic unit that is hydraulically coupled to a second hydraulic unit that drives the drive pulley of the distal boom section.

In accordance with a further feature, the distal pulley drives the first hydraulic unit through a gearbox.

In accordance with a further feature, there is further included a hydraulic reservoir coupled to the first hydraulic unit, a hydraulic coupler couples the first hydraulic unit to a hydraulic distributor.

In accordance with a further feature, there is further included an electric generator coupled to the distal pulley, the electric generator coupled to a regulator that regulates electric power to a power bank.

In accordance with a further feature, the main boom section includes a fixed boom portion that is disposed in a mount adjacent a proximal end of the fixed boom section, and at least one telescoping boom section that is operable to alternatively retract into the fixed boom section and extend from the fixed boom section.

In accordance with some embodiments of the inventive disclosure, there is provided a mobile boom assembly having power transfer between boom sections, including a rotatable mount, and a main boom section mounted in the rotatable mount adjacent a proximal end of the main boom section. The main boom section has a distal end that is opposite the proximal end, a main conveyor belt disposed on the main boom section that transits between the proximal end and the distal end, a first drive pulley at the proximal end that is configured to drive the main conveyor belt, and a distal pulley at the distal end that is turned by movement of the main conveyor belt. There is also included a distal boom section coupled to main boom section at the distal end of the main boom section, a distal conveyor belt transiting a length of the distal boom section from a first end to a second end, and a drive pulley disposed at the first end of the distal boom section. The distal boom section is positioned under the distal end of the main boom section such that material conveyed on the main boom section falls off the main conveyor belt at the distal end of the main boom section onto the distal conveyor belt. There is a second drive pulley in the distal boom section that is configured to drive the distal conveyor belt. There is also included a power coupling between the distal pulley of the main boom section and the second drive pulley that transfers power from the first drive pulley to the second drive pulley such that when the main conveyor belt is driven to move, and the distal conveyor belt is likewise driven to move through the power coupling.

In accordance with a further feature, the power coupling comprises a first drive gear driven by a shaft of the distal pulley, a second drive gear on a shaft of the second drive pulley, a chain disposed around the first drive gear and the second drive gear.

In accordance with a further feature, the power coupling comprises a first hydraulic unit coupled to the distal pulley, a second hydraulic unit coupled to the second drive pulley, hydraulic lines running between the first hydraulic unit and the second hydraulic unit.

In accordance with a further feature, turning of the distal pulley causes a hydraulic flow between the first hydraulic unit and the second hydraulic unit that causes the second hydraulic unit to turn the second drive pulley.

In accordance with a further feature, the distal pulley drives the first hydraulic unit through a gearbox.

In accordance with a further feature, there is further included a hydraulic reservoir coupled to the first hydraulic unit, and a hydraulic coupler that couples the first hydraulic unit to a hydraulic distributor.

In accordance with a further feature, the first hydraulic unit is hydraulically coupled to the second hydraulic unit through a circular hydraulic manifold.

In accordance with a further feature, there is further included an electric generator coupled to the distal pulley, the electric generator coupled to a regulator that regulates electric power to a power bank.

In accordance with a further feature, the main boom section includes a fixed boom portion that is disposed in the rotatable mount, and at least one telescoping boom section that is operable to alternatively retract into the fixed boom section and extend from the fixed boom section.

Although the invention is illustrated and described herein as embodied in a boom assembly having power provision at a remote end of the boom assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The inventive disclosure addresses the problem of certain conveyor boom systems in which a main boom section conveys material to a distal boom section which in turn conveys the material to a placement location. The material can be construction material, such as, for example, concrete. In general, the main boom section is mounted on a platform such as a truck or other vehicle. The distal boom section is attached to the distal end of the main boom section. In some embodiments the distal boom section can rotate in the horizontal direction about the distal end of the boom section. In addition, the main boom section can include two or more sub-sections in a telescoping relationship such that the main boom section can be extended and retracted as desired to deliver the conveyed material to the desired placement location.

Figure 1:
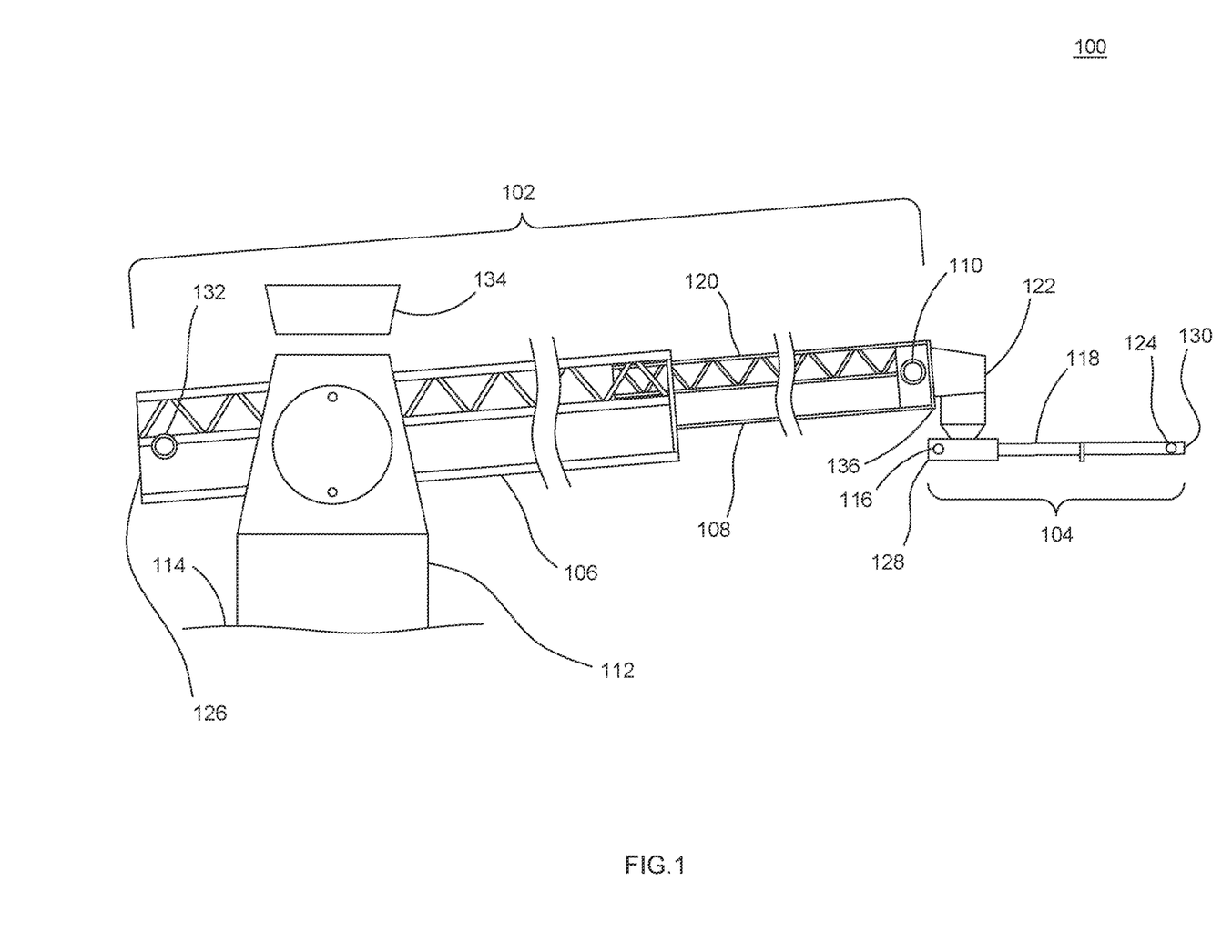
FIG. 1 shows a side view of an extendible boom assembly having a main section and a distal section that is driven by the main section, in accordance with some embodiments.

FIG. 1 shows a side view of an extendible boom assembly 100 having a main boom section 102 and a distal boom section 104 that is driven by the main boom section 102, in accordance with some embodiments. The main boom section 102 can have two or more boom sub-sections, such as a fixed boom section 106 and an extendible boom section 108. The extendible boom section 108 can be mounted in a telescoping relationship with the fixed boom section 106 to allow the extendible boom section 108 to be extended and retracted as desired. The fixed boom section 106 can be supported in a mount 112 that holds the fixed boom section 106 in place. The mount 112 can also rotate in the horizontal direction, as well as change the angle of the main boom section 102 in the vertical direction. The feed end 126 of the fixed boom section at the mount is a feed end because material is introduced onto the main section conveyor belt 120, such as through a hopper 134, and the material then is transported along the top of the main boom section 102 on the main boom section conveyor belt 120 to a distal end 136 where the main boom section conveyor belt 120 traverses around a distal pulley 110 and returns to the drive pulley 132 at the feed end 126. There can be multiple interim pulleys disposed along the fixed boom section 106 and extendible boom section 108 to take up slack and to feed out the belt when the extendible boom section 108 is being retracted or extended, respectively. It should be noted that a "pulley" as used here refers to a generally cylindrical structure that rotates about its cylindrical axis, and around which a conveyor belt is routed to change the direction of transit of the conveyor belt. As used herein, the terms "transit" and "transits" refers generally to the movement of a conveyor belt, or something being moved by a conveyor belt, or alternately to a conveyor belt moving along a circuit around a boom section or sections. The various conveyor belts described herein are continuous and pass along the top of their respective boom section in one direction to one end of the boom section, and then along the bottom of the boom section in the opposite direction to the other end, continuously.

In addition to the pulleys, there can be a plurality of rollers along each of the boom sections which support the conveyor belt 120, and which also rotate as the conveyor belt 120 travels past them. However the conveyor belt 120 does not change direction as it moves over a roller. A feed chute assembly 122 is positioned at the distal end 136 of the main boom section 102 to direct material conveyed along the main boom section 102 onto the distal boom section 104, and specifically onto the distal section conveyor belt 118. The feed chute assembly 122 can connect the distal boom section 104 to the distal end of the main boom section 102, and provide both support and rotational drive so that he distal boom section 104 can be rotated in the horizontal direction about the feed chute assembly 122. Further, power can be transferred from the main boom section 102 to the distal boom section 104 to drive the distal section conveyor belt 118.

To drive the distal section conveyor belt 118, power can be transferred from the distal pulley 110 of the main boom section to the drive pulley 116 at the proximal end 128 of the distal boom section 104. The drive pulley 116 imparts force into the distal section conveyor belt 118 to cause the distal section conveyor belt 118 to transit around the distal pulley 124 at the distal end 130 of the distal boom section 104 and return to the drive pulley 116 of the distal boom section 104. There are a variety of mechanical arrangements that can transfer power. In some embodiments, in addition to transferring power, some of the power used to drive the main boom section conveyor belt 120 can be used to provide power to other devices or tools at the distal end 136 of the main boom section 102.

Figure 2:
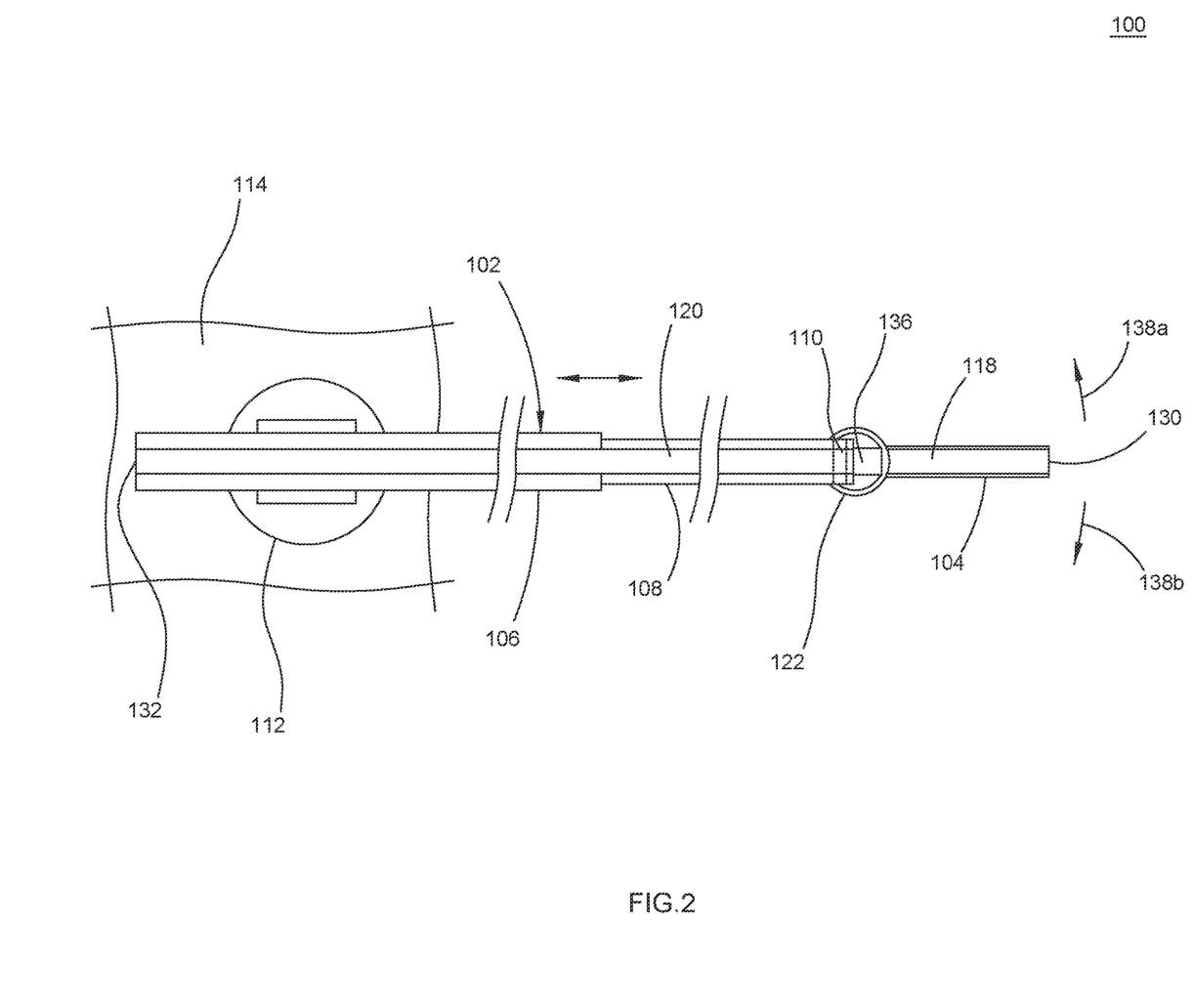
FIG. 2 shows a top view of the extendible boom assembly shown in FIG. 1.

FIG. 2 shows a top view of the extendible boom assembly 100 shown in FIG. 1. In this view the main boom section conveyor belt 120 can be seen on the top of the main boom section 102, and likewise, the distal boom section conveyor belt 118 can be seen on the top of the distal boom section 104. The distal boom section 104 can be rotated in the horizontal direction about the feed chute assembly 122, meaning the distal end 130 of the distal boom section 104 can move in the direction of arrows 138a or 138b.

Since the distal boom section has a distal conveyor belt which needs to be driven to move the distal conveyor belt, there must be power provided to a drive pulley of the distal boom section. Conventionally, this would involve providing a motor on the distal boom section and routing power lines along the main boom assembly, down the coupling that holds the distal boom section to the distal end of the main boom assembly, and to the motor. This presents a problem as these lines must be heavily protected to ensure they are not subject to damage. The problem is considerably worse when the main boom assembly is a telescoping boom assembly because the lines must move with the telescoping boom section, and not allow, for example, the power lines to collect on the ground or other equipment below the main boom assembly. The present invention solves this problem by use of a power coupling between the distal pulley of the main boom assembly, and the drive pulley of the distal boom section. The power coupling transfers power from rotation of the distal pulley to the drive pulley of the distal boom section. The power coupling can be mechanical (e.g. chain/belt/gear drive), or hydraulic. In addition, because personnel working at the distal boom section often require power to operate equipment, it is further contemplated that such equipment can also be powered from the distal pulley of the main boom assembly, either electrically or hydraulically.

Figure 3:
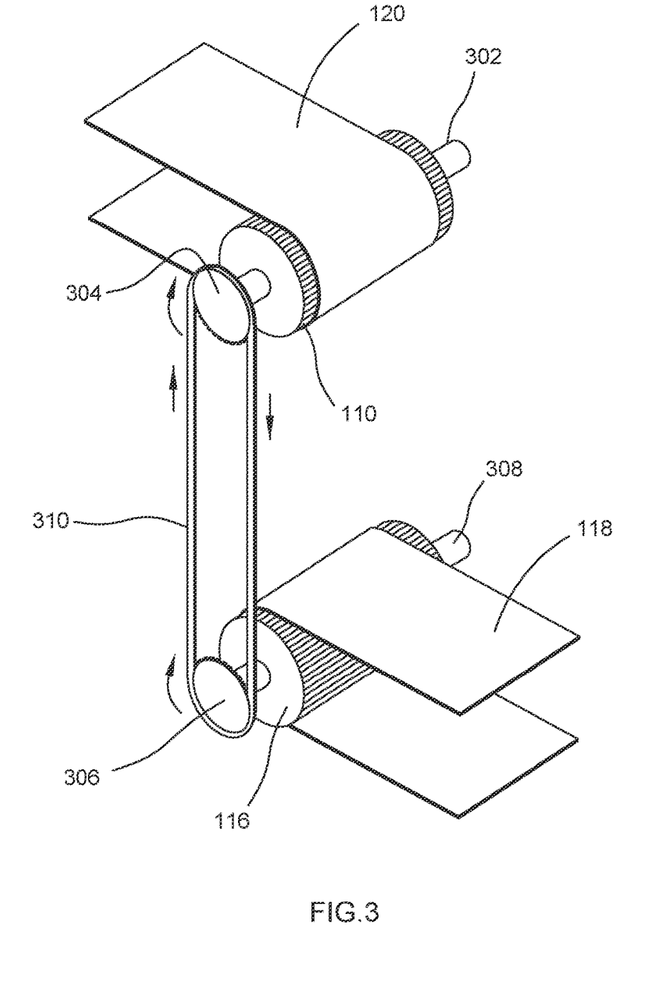
FIG. 3 shows a direct drive arrangement for transferring power from the main section conveyor to the distal conveyor section, in accordance with some embodiments.

FIG. 3 shows a direct drive arrangement for transferring power from the main boom section conveyor belt 120 to the distal boom section conveyor belt 118, in accordance with some embodiments. The support structure of the boom sections as well as the feed chute assembly have been removed from this drawing. The same is true for FIGS. 4-7 as well. The main boom section conveyor belt 120 is driven by drive pulley 132 at the fixed end 126 of the main boom section 102. Specifically, drive pulley 132 is rotated, such as by a motor, to cause the main boom section conveyor belt 120 to move. As the main boom section conveyor belt 120 transits around the distal pulley 110, it causes the distal pulley 110 to rotate accordingly. The distal pulley 110 is mounted on a shaft 302 that is supported by the structure of the main boom assembly. A drive gear or wheel 304 is mounted on the shaft 302 and turns with the shaft 302. A chain or belt 310 is routed over the drive gear or wheel 304 and a matching gear or wheel 306 is connected to the shaft 308 of the drive pulley 116 of the distal boom section. A simple arrangement is shown here for clarity, but in order to allow the distal boom section to rotate the chain 310 will be routed over tensioners that allow for the difference in angle and distance between the drive gear 304 and the matching gear 306 as the distal boom section is moved relative to the main boom section. The drive pulley 116 of the distal boom section can have the same diameter as the distal pulley 110, in which case the size of the drive gear 304 can be same as the matching gear 306 so that the distal section conveyor belt 118 moves at the same speed as the main boom section conveyor belt 120. If different speeds are desired then the ratio of the diameters of the pulley 110, 116 and gears 304, 306 can be adjusted accordingly. It will also be appreciated by those skilled in the art that instead of gears and a chain (304, 306, 310), wheels and a belt can be used. A belt may tolerate rotation of the distal boom section better than a chain in some applications.

Figure 4:
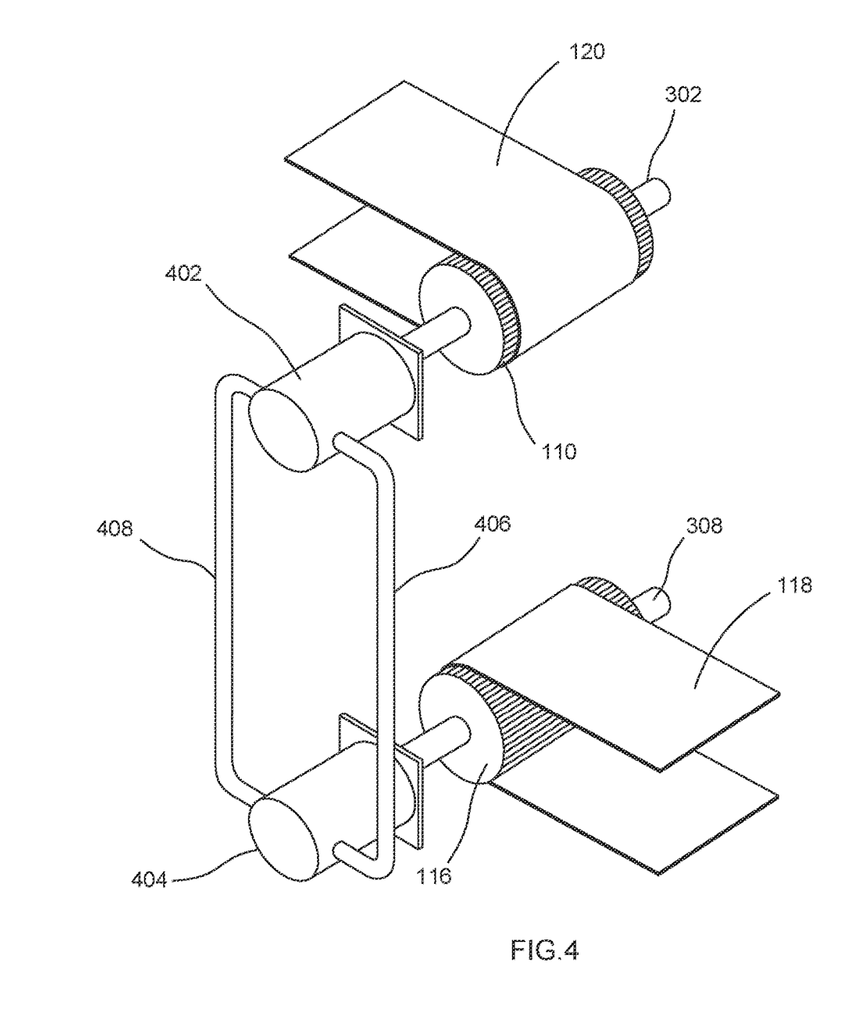
FIG. 4 shows a hydraulic arrangement for transferring power from the main section conveyor to the distal conveyor section, in accordance with some embodiments.

FIG. 4 shows a hydraulic drive system for transferring power from the main boom section conveyor belt 120 to the distal boom section conveyor belt 118, in accordance with some embodiments. As in FIG. 3, The distal pulley is mounted on the shaft 302, but the shaft 302 drives a first hydraulic unit 402, which can be configured as a hydraulic pump. The first hydraulic unit 402 produces hydraulic flow in a hydraulic send line 406 which is connected to a second hydraulic unit 404, which can be configured as a hydraulic motor. The hydraulic flow created by the first hydraulic unit 402 causes the second hydraulic unit to rotate shaft 308, which is coupled to drive pulley 116. Return hydraulic line 408 returns hydraulic fluid from the second hydraulic unit 404 to the first hydraulic unit 402. As in FIG. 3, then movement of the main boom section conveyor belt 120 drives movement of the distal section conveyor belt 118. The hydraulic lines 406, 408 may be more preferable to the chain/belt drive system of FIG. 3 for some applications. The first hydraulic unit 402 is used to create hydraulic pressure and flow of hydraulic fluid in the lines 406, 408 in response to being drive by shaft 302. In response to the hydraulic flow created by the first hydraulic unit 402, the second hydraulic unit 404 converts the hydraulic force into rotational motion of the shaft 308.

Figure 5:
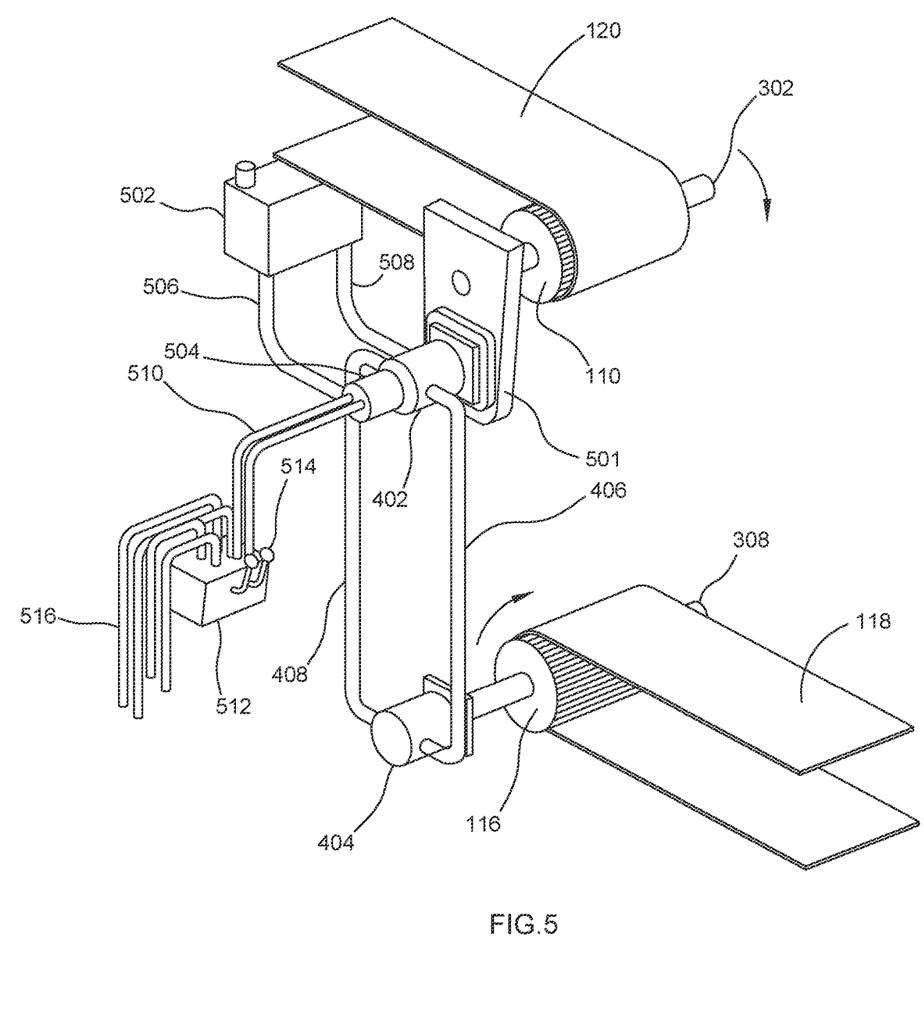
FIG. 5 shows a hydraulic arrangement for transferring power from the main section conveyor to the distal conveyor section, and providing power to external equipment located proximate to the distal end of the main boom section, in accordance with some embodiments.

FIG. 5 shows a hydraulic drive for transferring power from the main boom section conveyor belt 120 to the distal boom section conveyor belt 118, and providing power to external equipment located proximate to the distal end of the main boom section, in accordance with some embodiments. As in FIG. 4 a first hydraulic unit is coupled to shaft 302 of the distal pulley 110 at the distal end of the main boom section. The shaft 302 is connected to a gearbox 501 that can adjust the rate at which the first hydraulic unit 402 is driven relative to the turn rate of the distal pulley 10 and shaft 302. A hydraulic reservoir 502 provides additional hydraulic fluid as needed in the system through lines 506, 508. As in FIG. 4, the first hydraulic unit 402 drives the second hydraulic unit 404 in the distal boom section, which drive the shaft 308 of the drive pulley 116, which is a second drive pulley (the first drive pulley being in the main boom assembly). However hydraulic flow generated by the first hydraulic unit 402 is provided through a hydraulic coupling 504 to a hydraulic distributor 512 through lines 510. The hydraulic distributor 512 provides hydraulic flow through one or more lines 516 to hydraulic equipment that can be operated by personnel at the distal end of the boom section. Controls 514 for each line 516 adjust the flow rate of fluid in each auxiliary line 516. Thus, the movement of the main boom section conveyor belt 120 can be used to drive the movement of the distal boom section conveyor belt 118 as well as allow for the operation of hydraulic equipment or tools. For example, the auxiliary lines 516 may be used to drive hydraulic linear actuators to raise or lower the distal end of the distal boom section, or to rotate the distal boom section, or both.

Figure 6:
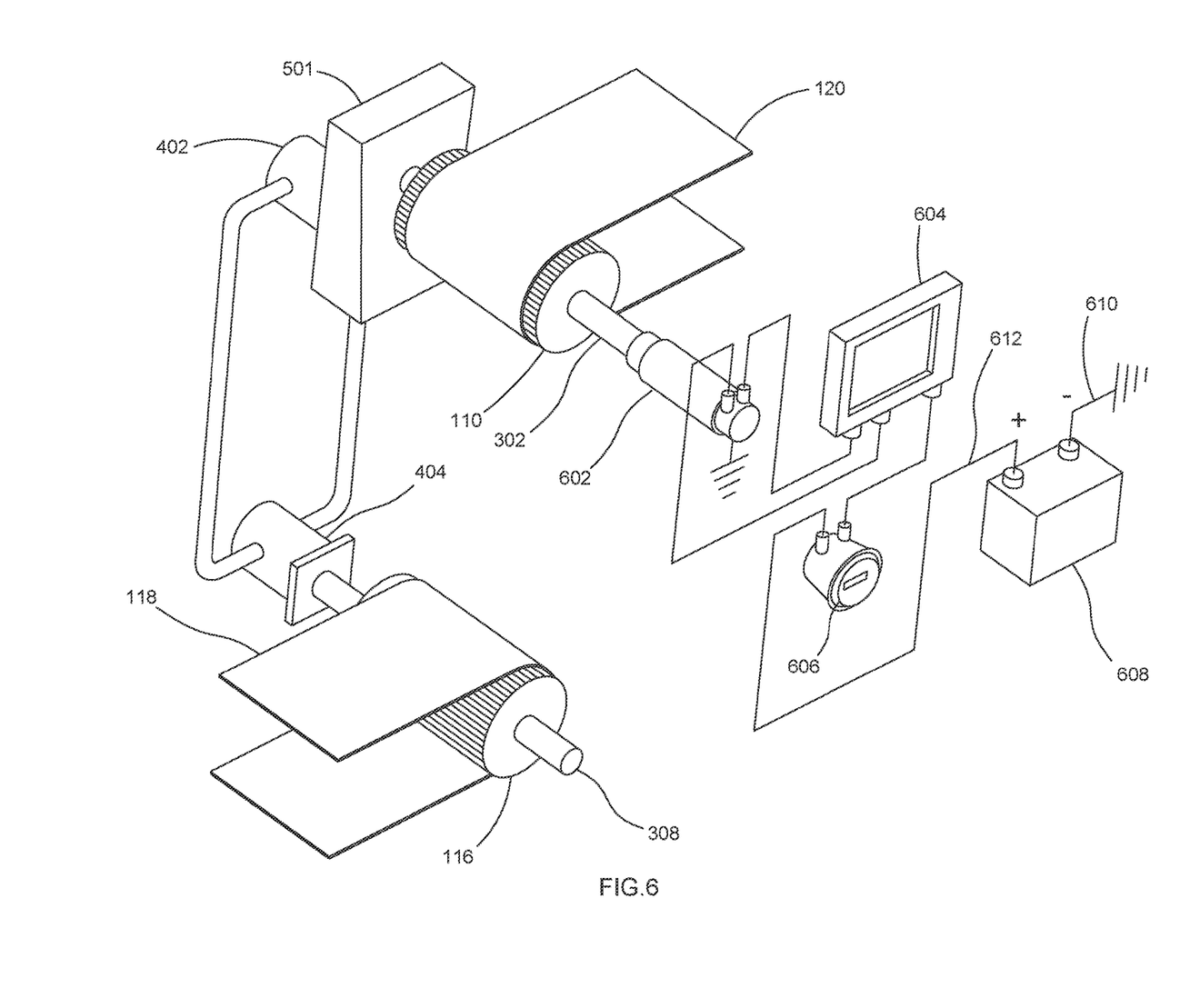
FIG. 6 shows a hydraulic arrangement for transferring power from the main section conveyor to the distal conveyor section, and for generating electric power for use at the location of the distal end of the main boom section, in accordance with some embodiments.

FIG. 6 shows a hydraulic arrangement for transferring power from the main boom section conveyor belt to the distal boom section, and for generating electric power for use at the location of the distal end of the main boom section, in accordance with some embodiments. Building from FIG. 5, an electric generator 602 is drive by the shaft 302 and provides electric power to a regulator 604. Electric current can be provided through an ammeter 606 to a power bank 608 that comprises one or more battery cells. As a result, there is a positive and a negative DC (direct current) voltage produced that can be used directly, or provided to an inverter to generate an AC (alternating current) to power, for example, tools, welders, and other equipment at the distal end of the main boom section. This arrangement provides a convenience for workers so that they do not have to carry such equipment to the site. The power bank 608, regulator 604 and ammeter 606 can be mounted to the main boom section structure. In some embodiments, the electric power can be used to drive electric motors that can operator to rotate and/or tile the distal boom section relative to the main boom section.

Figure 7:
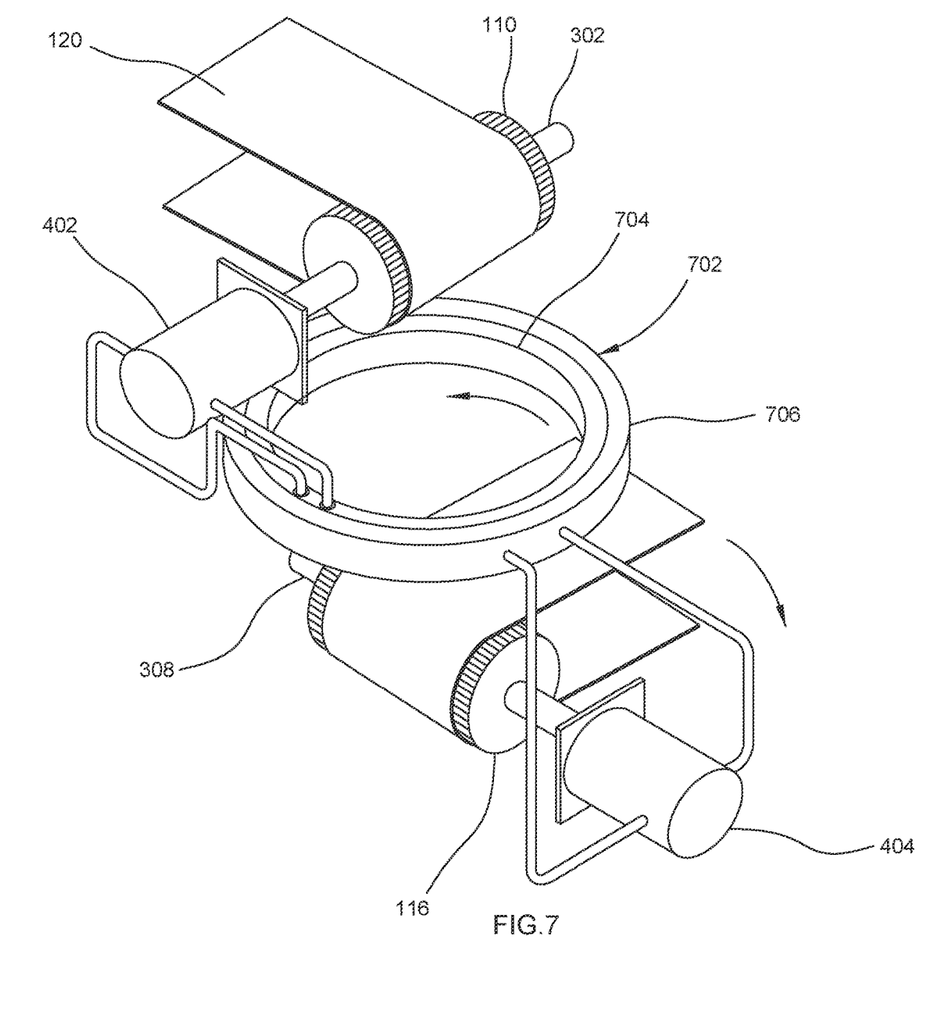
FIG. 7 shows a hydraulic arrangement for transferring power from the main section conveyor to the distal conveyor section through a circular hydraulic manifold, in accordance with some embodiments.

FIG. 7 shows a hydraulic arrangement for transferring power from the main boom section conveyor belt to the distal boom section conveyor through a circular hydraulic manifold 702, in accordance with some embodiments. The circular hydraulic manifold 702 comprises in inner ring 704 and an outer ring 706. The rings 704, 706 define a plane in which the circular shape of the two rings 704, 706 lie, and the rings 704, 706 can rotate about an axis perpendicular to the plane defined by the rings 704, 706. The circular manifold 702 can be disposed about the feed chute assembly (122). The inner ring 704 can be fixed relative to the main boom section, while the outer ring 706 can be fixed relative to the distal boom section. Thus, when the distal boom section is rotated relative to the main boom section, the rings 704, 706 move relative to each other. The first hydraulic unit 402 is connected to the inner ring 704, while the hydraulic motor 404 is connected to the outer ring 706. Hydraulic fluid passes between the rings 704, 706 in both directions. This arrangement greatly simplifies the hydraulic lines since the hydraulic lines don't need to have lengths that allow for rotation of the distal boom section.

A power transfer system for use on conveyor boom systems has been disclosed which provides the benefit of reducing the number of lines (hydraulic or electric) that need to be run along the main boom section. The turning of the distal pulley by the main conveyor belt is used to provide power to the distal boom section. That power can be used to move the distal conveyor belt, as well as to turn the distal section, among other operations. Thus, by accessing the power provided by the main conveyor belt turning the distal pulley at the remote end of the main boom assembly, the distal section can be powered to, among other operations, drive the distal conveyor belt, as well as to turn the distal boom section as needed. In addition, power can be fed to other equipment at the terminal end of the main boom assembly that can, for example, drive tools and other equipment used by personnel working near the terminal end of the main boom assembly.

The claims appended hereto are meant to cover all modifications and changes within the scope and spirit of the present invention.

What is claimed is:

1. A boom assembly for placement of construction material, comprising:
   a main boom section having a distal end and a proximal end opposite the distal end, a distal pulley positioned at the distal end of the main boom section, a main boom section conveyor belt transiting the main boom section which passes over and turns the distal pulley of the main boom section;
   a distal boom section that is coupled to the distal end of the main boom section and which has a drive pulley around which a distal boom section conveyor belt is driven to transit the distal boom section;
   a power coupling that physically couples the distal pulley of the main boom section to the drive pulley of the distal boom section such that rotation of the distal pulley of the main boom section is transferred through the power coupling to the drive pulley of the distal boom section to cause the drive pulley of the distal boom section to rotate; and
   wherein the power coupling transfers power from rotation of the distal pulley of the main boom section to the drive pulley of the distal boom section to turn the distal boom section conveyor belt.

2. The boom assembly of claim 1, wherein the power coupling comprises a drive gear coupled to the distal pulley of the main boom section, a chain that is disposed around the drive gear and a matching gear that is coupled to the drive pulley of the distal boom section.

3. The boom assembly of claim 1, wherein the power coupling comprises a first hydraulic unit that is coupled to and driven by the distal pulley of the main boom section that is hydraulically coupled to a second hydraulic unit that drives the drive pulley of the distal boom section.

4. The boom assembly of claim 3, wherein the distal pulley drives the first hydraulic unit through a gearbox.

5. The boom assembly of claim 4, further comprising a hydraulic reservoir coupled to the first hydraulic unit, a hydraulic coupler couples the first hydraulic unit to a hydraulic distributor.

6. The boom assembly of claim 1, further comprising an electric generator coupled to the distal pulley, the electric generator coupled to a regulator that regulates electric power to a power bank.

7. The boom assembly of claim 1, wherein the main boom section includes a fixed boom section that is disposed in a mount adjacent a proximal end of the fixed boom, and at least one telescoping boom section that is operable to alternatively retract into the fixed boom section and extend from the fixed boom section.

8. A mobile boom assembly having power transfer between boom sections, comprising:
   a rotatable mount;
   a main boom section mounted in the rotatable mount adjacent a proximal end of the main boom section, the main boom section having a distal end that is opposite the proximal end, a main conveyor belt disposed on the main boom section that transits between the proximal end and the distal end, a first drive pulley at the proximal end that is configured to drive the main conveyor belt, and a distal pulley at the distal end that is turned by movement of the main conveyor belt;
   a distal boom section coupled to the main boom section at the distal end of the main boom section, a distal conveyor belt transiting a length of the distal boom section from a first end to a second end, a second drive pulley disposed at the first end of the distal boom section, the distal boom section being positioned under the distal end of the main boom section such that material conveyed on the main boom section falls off the main conveyor belt at the distal end of the main boom section onto the distal conveyor belt, the second drive pulley being configured to drive the distal conveyor belt; and
   a power coupling that is coupled to the distal pulley of the main boom section and the second drive pulley to transfer power from the distal pulley of the main boom section to the second drive pulley such that when the main conveyor belt is driven to move the power coupling causes the second drive pulley to rotate which causes the distal conveyor belt to move.

9. The mobile boom assembly of claim 8, wherein the power coupling comprises a first drive wheel driven by a shaft of the distal pulley, a second drive wheel on a shaft of the second drive pulley, a belt disposed around the first drive wheel and the second drive wheel.

10. The mobile boom assembly of claim 8, wherein the power coupling comprises a first hydraulic unit coupled to the distal pulley, a second hydraulic unit coupled to the second drive pulley, hydraulic lines connecting the first hydraulic unit and the second hydraulic unit.

11. The mobile boom assembly of claim 10, wherein turning of the distal pulley causes a hydraulic flow between the first hydraulic unit and the second hydraulic unit that causes the second hydraulic unit to turn the second drive pulley.

12. The mobile boom assembly of claim 10, wherein the distal pulley drives the first hydraulic unit through a gearbox.

13. The mobile boom assembly of claim 10, further comprising a hydraulic reservoir coupled to the first hydraulic unit, and a hydraulic coupler that couples the first hydraulic unit to a hydraulic distributor.

14. The mobile boom assembly of claim 10, wherein the first hydraulic unit is hydraulically coupled to the second hydraulic unit through a circular hydraulic manifold.

15. The mobile boom assembly of claim 8, further comprising an electric generator coupled to the distal pulley, the electric generator coupled to a regulator that regulates electric power to a power bank.

16. The mobile boom assembly of claim 8, wherein the main boom section includes a fixed boom portion that is disposed in the rotatable mount, and at least one telescoping boom section that is operable to alternatively retract into the fixed boom section and extend from the fixed boom section.

\* \* \* \* \*